United States Patent
Moraleda et al.

(10) Patent No.: US 9,317,775 B2
(45) Date of Patent: Apr. 19, 2016

(54) RECOGNITION PROCEDURE FOR IDENTIFYING MULTIPLE ITEMS IN IMAGES

(71) Applicants: Jorge Moraleda, Menlo Park, CA (US); Sri Kaushik Pavani, Chennai (IN); Anshul Garg, Haryana (IN)

(72) Inventors: Jorge Moraleda, Menlo Park, CA (US); Sri Kaushik Pavani, Chennai (IN); Anshul Garg, Haryana (IN)

(73) Assignee: RICOH CO., LTD., Tokyo (JP)

( * ) Notice: Subject to any disclaimer, the term of this patent is extended or adjusted under 35 U.S.C. 154(b) by 150 days.

(21) Appl. No.: 13/967,294

(22) Filed: Aug. 14, 2013

(65) Prior Publication Data

US 2015/0049902 A1 Feb. 19, 2015

(51) Int. Cl.
*G06K 9/62* (2006.01)
*G06K 9/00* (2006.01)
*G06K 9/46* (2006.01)

(52) U.S. Cl.
CPC .......... *G06K 9/6202* (2013.01); *G06K 9/00624* (2013.01); *G06K 9/4619* (2013.01); *G06K 9/6263* (2013.01)

(58) Field of Classification Search
None
See application file for complete search history.

(56) References Cited

U.S. PATENT DOCUMENTS

| | | | |
|---|---|---|---|
| 5,748,796 A * | 5/1998 | Pennino et al. | 382/254 |
| 2008/0306787 A1 * | 12/2008 | Hamilton et al. | 705/7 |
| 2009/0063307 A1 * | 3/2009 | Groenovelt et al. | 705/28 |
| 2010/0211602 A1 | 8/2010 | Menon et al. | |
| 2011/0011936 A1 | 1/2011 | Morandi et al. | |
| 2012/0323620 A1 * | 12/2012 | Hofman et al. | 705/7.11 |
| 2013/0004090 A1 * | 1/2013 | Kundu et al. | 382/232 |
| 2015/0049943 A1 * | 2/2015 | Hamsici | 382/170 |

FOREIGN PATENT DOCUMENTS

WO WO 2009/027839 3/2009

OTHER PUBLICATIONS

European Search Report for EP Application 14180768.5, dated Mar. 11, 2015, 8 pages.
Khosla Deepak et al., Method of Recognition and Pose Estimation of Multiple Occurrences of Multiple Objects in Visual Images, dated May 13, 2011, 11 pages, Automatic Target Recognition XXI, SPIE.

* cited by examiner

*Primary Examiner* — Matthew Bella
*Assistant Examiner* — Soo Shin
(74) *Attorney, Agent, or Firm* — Patent Law Works LLP

(57) ABSTRACT

The disclosure includes a system and method for identifying multiple items in an image. A image recognition application receives a query image of items, computes features of the query image, for each feature finds an indexed image with closest matched features in a database, determines that the shape of the matched features is geometrically consistent, determines whether the query image matches the indexed image, responsive to the query image matching the indexed image, returns inliers, determines a region of interest where the match was found in the query image, removes inliers from the set of features to reduce the set of features and returns all matches found when the query image fails to match the indexed image.

20 Claims, 15 Drawing Sheets

520

522

524

526

528

540

542

544

546

560

562

564

566

580

582

584

586

RECOGNITION PROCEDURE FOR IDENTIFYING MULTIPLE ITEMS IN IMAGES

BACKGROUND OF THE INVENTION

1. Field of the Invention

The specification relates to a recognition procedure for identifying multiple items in images. In particular, the specification relates to a system and method for identifying products in images.

2. Description of the Background Art

Image recognition is a useful tool for obtaining additional information about objects. For example, a user can capture an image of a barcode or a QR code on a product, send the image to a server and the server identifies product information associated with the identifier. In another example, a user can capture an image of the product itself and send the image to a server that identifies the product based on information in the image.

SUMMARY OF THE INVENTION

The disclosure includes a system and method for identifying multiple items in images. In one embodiment, the system includes an image recognition application. The image recognition application is configured to receive a query image of items, compute features of the query image and compare the features from the query image to indexed images in a database, determine that a comparison of the features forms a shape that is geometrically consistent and whether the query image matches the indexed image, responsive to the query image matching the indexed image, return inliers, determine a region of interest where the match was found in the query image, remove inliers from the set of features to reduce the set of features, for each feature find the indexed image with the closest matched features in the database until the query image fails to match the indexed image and return all matches found.

The features can comprise location, orientation and an image descriptor. The inliers can be a set of matched features. In some embodiments, it can be determined whether the query image matches the indexed image, the matched region in the query image is blurred out and features of the query image are computed until the query image fails to match the indexed image.

In some embodiments, items can be products and a planogram can be generated from indexed products. Products can be analyzed based on the query images and the planogram. Statistics about the location of the products and frequency of purchase can be generated. Other aspects include corresponding methods, systems, apparatuses, and computer program products for these and other innovative aspects.

The specification advantageously describes technology for identifying multiple products in the image. As a result, this allows for the automation of analysis of the items. For example, it can be determined in real-time that shelves need to be restocked and that the items should be positioned in a particular way to maximize purchases.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
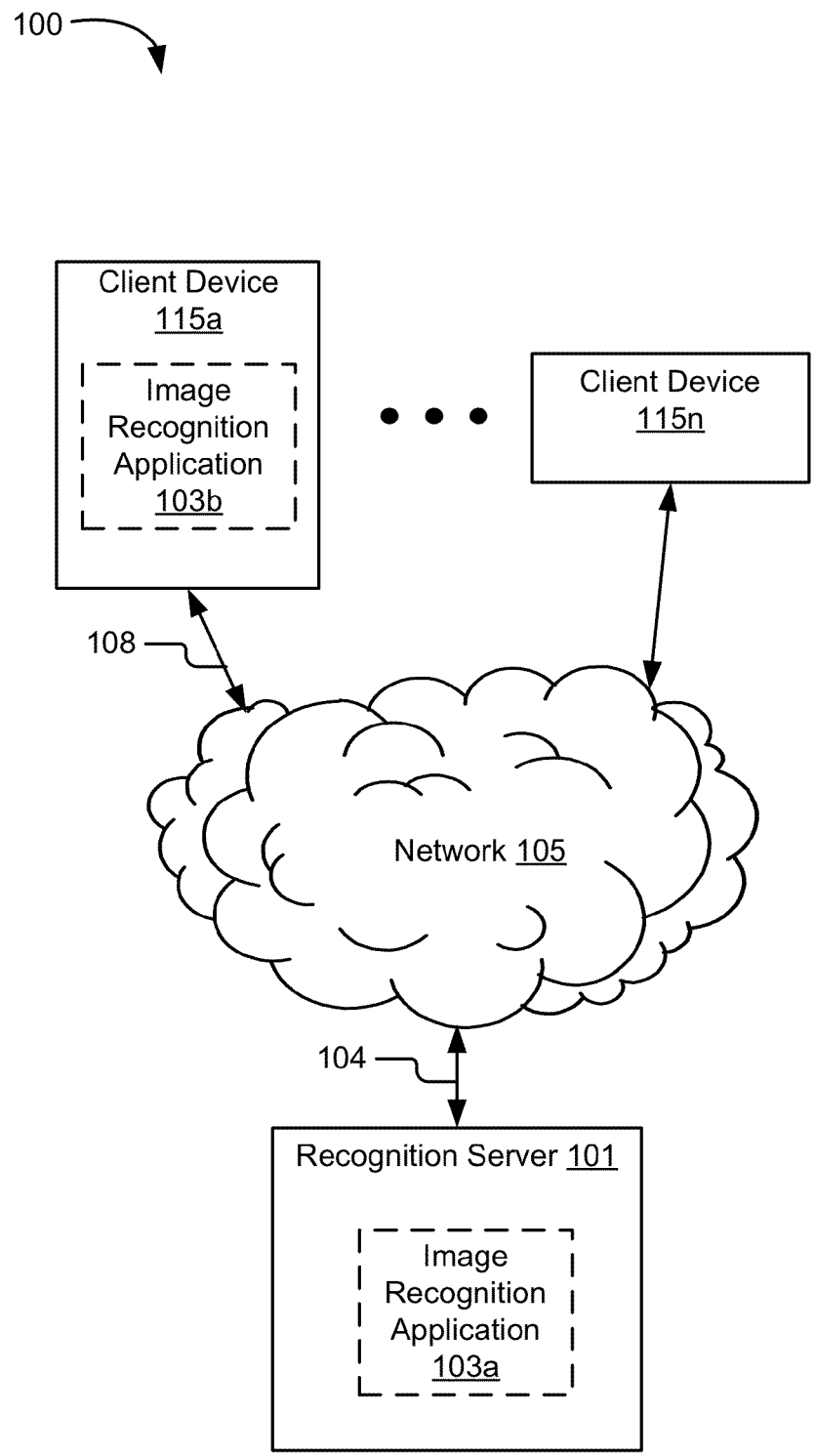
FIG. 1 is a high-level block diagram illustrating one embodiment of a system for indexing images of products to generate a planogram.

A system and method for identifying multiple items in images. In the following description, for purposes of explanation, numerous specific details are set forth in order to provide a thorough understanding of the invention. It will be apparent, however, to one skilled in the art that the embodiments can be practiced without these specific details. In other instances, structures and devices are shown in block diagram form in order to avoid obscuring the invention. For example, the invention is described in one embodiment below with reference to client devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for identifying multiple items in images. The illustrated system 100 includes client devices 115a . . . 115n that can be accessed by users and a recognition server 101. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or includes portions of a telecommunications network for sending data in a variety of different communication protocols. In some embodiments, the network 105 includes Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the client devices 115 and the recognition server 101, in practice one or more networks 105 can be connected to these entities.

In one embodiment, the image recognition application 103a may be operable on the recognition server 101, which is coupled to the network 105 via signal line 104. The recognition server 101 may be a computing device including a processor, a memory and network communication capabilities. In some embodiments, the recognition server 101 sends and receives data to and from other entities of the system 100 via the network 105. For example, the recognition server 101 sends and receives data including images of products to and from the client device 115. The images of products received by the recognition server 101 can include an image captured by the client device 115, an image copied from a website or an email or an image from any other source. While FIG. 1 includes one recognition server 101, the system 100 may include one or more recognition servers 101. The recognition server 101 also includes a data storage 243, which is described below in more detail with reference to FIG. 2.

In another embodiment, the image recognition application 103b may be operable on a client device 115a, which is connected to the network 105 via signal line 108. In some embodiments, the client device 115a, 115n may be a computing device that includes a memory, a processor and a camera, for example a laptop computer, a desktop computer, a tablet computer, a mobile telephone, a personal digital assistant (PDA), a mobile email device, a webcam or any other electronic device capable of accessing a network 105. The client device 115 includes a display for viewing information provided by the recognition server 101. In some embodiments, the camera is a high resolution camera. The client devices 115a, 115n in FIG. 1 are used by way of example. While FIG. 1 illustrates two client devices 115a and 115n, the disclosure applies to a system architecture having one or more client devices 115.

In some embodiments, the image recognition application 103b acts as a thin-client application that may be stored in part on the client device 115 and in part as components of the recognition server 101. For example, the image recognition application 103b on the client device 115 could include software for capturing the image and, in some embodiments, performs feature identification. The image recognition application 103b sends a query image to the image recognition application 103a on the recognition server to retrieve matching images.

The client device 115 is adapted to send and receive data to and from the recognition server 101. For example, the client device 115 sends a query image to the recognition server 101 and the recognition server 101 provides data in JSON (JavaScript Object Notation) format about one or more objects recognized in the query image to the client device 115.

The image recognition application 103 is code and routines for indexing synthetically modified images, receiving query images and identifying multiple items of interest in the query images. In some embodiments, the image recognition application 103 can be implemented using hardware including a field-programmable gate array (FPGA) or an application-specific integrated circuit (ASIC). In some other embodiments, the image recognition application 103 can be implemented using a combination of hardware and software. In some embodiments, the image recognition application 103 may be stored in a combination of the devices and servers, or in one of the devices or servers.

In one embodiment, the image recognition application 103 receives images of a packaged product. The image recognition application 103 synthetically modifies the images by cropping the background region from the images, scaling each of the images based on which is a minimum value among width and height of the image, blurring and brightening each of the images. In one embodiment, the image recognition application 103 indexes the images in a k-D tree as being associated with the packaged product.

In one embodiment, the image recognition application 103 receives a query image of items. The image recognition application 103 computes features for the query image and for each feature the image recognition application 103 finds an indexed image that is a closest match. The image recognition application 103 determines that the query image matches the indexed image when the matched features are geometrically consistent. The image recognition application 103 is described below in more detail with reference to FIGS. 2 and 3.

Image Recognition Application

Figure 2:
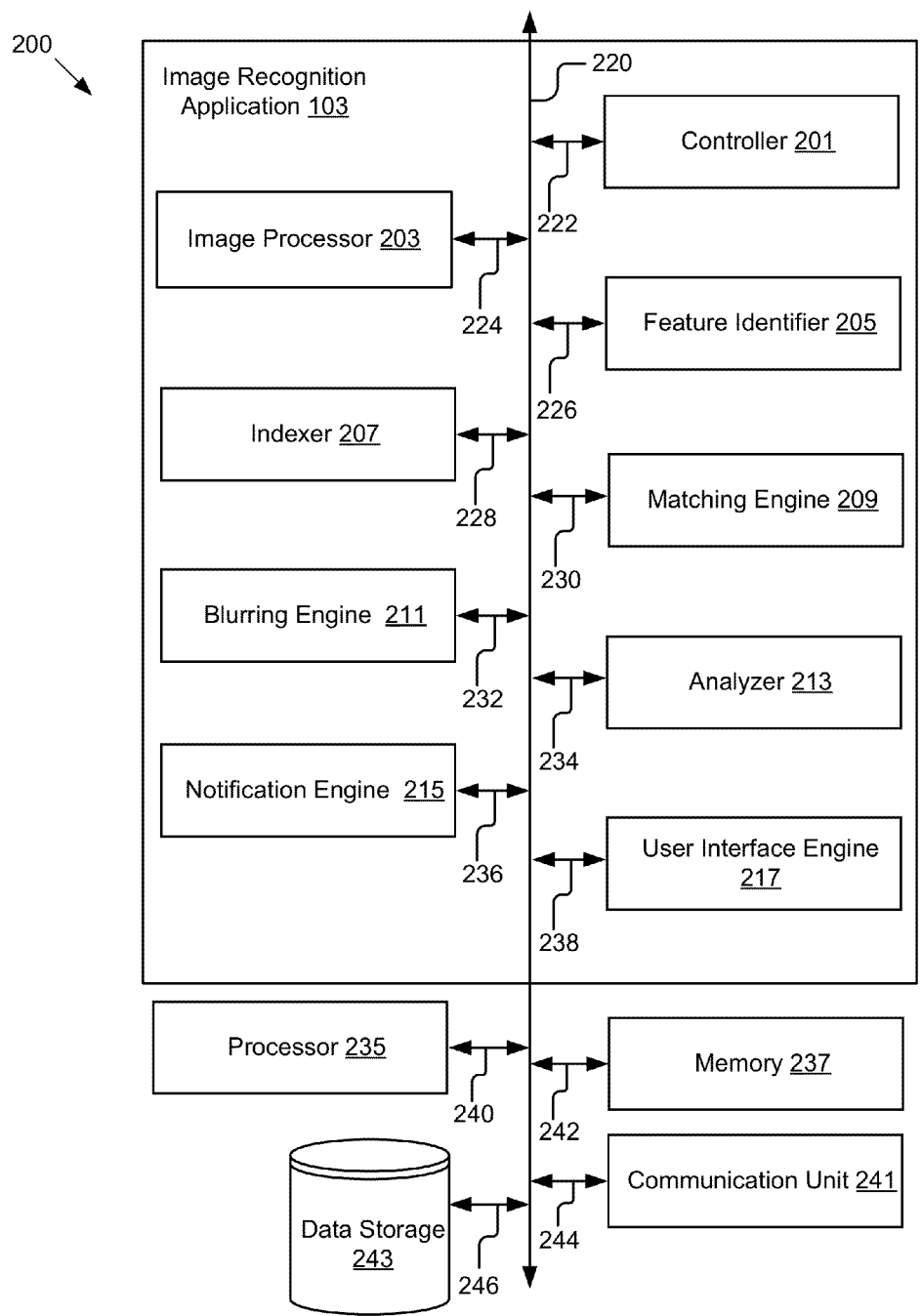
FIG. 2 is a block diagram illustrating one embodiment of an image recognition application.

Referring now to FIG. 2, an example of the image recognition application 103 is shown in more detail. FIG. 2 is a block diagram of a computing device 200 that includes an image recognition application 103, a processor 235, a memory 237, a communication unit 241 and data storage 243 according to some examples. The components of the computing device 200 are communicatively coupled by a bus 220. The bus 220 may represent one or more buses including an industry standard architecture (ISA) bus, a peripheral component interconnect (PCI) bus, a universal serial bus (USB), or some other bus known in the art to provide similar functionality. In some embodiments, the computing device 200 can be one of a client device 115 and a recognition server 101.

The processor 235 includes an arithmetic logic unit, a microprocessor, a general purpose controller or some other processor array to perform computations and to optionally provide electronic display signals to a display device. The processor 235 is coupled to the bus 220 for communication with the other components via signal line 238. The processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that can be executed by the processor 235. The memory 237 is coupled to the bus 220 for communication with the other components via signal line 240. The instructions and/or data may include code for performing the techniques described herein. The memory 237 may be a dynamic random access memory (DRAM) device, a static random access memory (SRAM) device, flash memory or some other memory device known in the art. In some embodiments, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 241 is hardware for receiving and transmitting data by linking the processor 235 to the network 105 and other processing systems. The communication unit 241 receives data such as requests from the user device 103 and transmits the requests to the controller 201, for example a request to index a product image. The communication unit 241 also transmits information including recognition results to the client device 115 for display, for example, in response to a query image. The communication unit 241 is coupled to the bus 220 via signal line 244. In one embodiment, the communication unit 241 includes a port for direct physical connection to the client device 115 or to another communication channel. For example, the communication unit 241 includes an RJ45 port or similar port for wired communication with the client device 115. In another embodiment, the communication unit 241 includes a wireless transceiver (not shown) for exchanging data with the client device 115 or any other communication channel using one or more wireless communication methods, such as IEEE 802.11, IEEE 802.16, Bluetooth® or another suitable wireless communication method.

In yet another embodiment, the communication unit 241 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 241 includes a wired port and a wireless transceiver. The communication unit 241 also provides other conventional connections to the network 105 for distribution of files and/or media objects using standard network protocols such as TCP/IP, HTTP, HTTPS and SMTP as will be understood to those skilled in the art.

The data storage 243 is a non-transitory memory that stores data for providing the functionality described herein. The data storage 243 may be a dynamic random access memory (DRAM) device, a static random access memory (SRAM) device, flash memory or some other memory devices. In some embodiments, the data storage 243 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the data storage 243 is communicatively coupled to the bus 220 via signal line 246. In one embodiment, the data storage 243 stores the synthetically modified base images of products of interest, for example, the scaled images, the blurred images and the brightened images. In one embodiment, the data storage 243 indexes the features extracted from base images in a k-dimensional (k-D) tree for faster retrieval. In one embodiment, the data storage 243 associates statistics generated from analyzing the base images in the k-D tree. In another embodiment, the data storage 243 stores the data in Extensible Markup Language (XML) file format.

In one embodiment, the image recognition application 103 includes a controller 201, an image processor 203, a feature identifier 205, an indexer 207, a matching engine 209, a blurring engine 211, an analyzer 213, a notification engine 215 and a user interface engine 217. The components of the image recognition application 103 are communicatively coupled via the bus 220.

The controller 201 can be software including routines for handling communications between the image recognition application 103 and other components of the computing device 200. In one embodiment, the controller 201 can be a set of instructions executable by the processor 235 to provide the functionality described below for handling communications between the image recognition application 103 and other components of the computing device 200. In another embodiment, the controller 201 can be stored in the memory 237 of the computing device 200 and can be accessible and executable by the processor 235. In either embodiment, the controller 201 can be adapted for cooperation and communication with the processor 235 and other components of the computing device 200 via signal line 222.

In one embodiment, the controller 201 sends and receives data, via the communication unit 241, to and from one or more of a client device 115 and a recognition server 101. For example, the controller 201 receives, via the communication unit 241, an image from a client device 115 operated by a user and sends the image to the image processor 203. In another example, the controller 201 receives graphical data for providing a user interface to a user from the user interface module 217 and sends the graphical data to a client device 115, causing the client device 115 to present the user interface to the user.

In one embodiment, the controller 201 receives data from other components of the image recognition application 103 and stores the data in the data storage 243. For example, the controller 201 receives data including image features from the feature identifier 205 and stores the data in the data storage 243. In another embodiment, the controller 201 retrieves data from the data storage 243 and sends the data to other components of the image recognition application 103. For example, the controller 201 retrieves data including indexed images from the data storage 243 and sends the retrieved data to the matching engine 209.

The image processor 203 can be software including routines for receiving and processing images for indexing and recognition. In one embodiment, the image processor 203 can be a set of instructions executable by the processor 235 to provide the functionality described below for processing the images for indexing and recognition. In another embodiment, the image processor 203 can be stored in the memory 237 of the computing device 200 and can be accessible and executable by the processor 235. In either embodiment, the image processor 203 can be adapted for cooperation and communication with the processor 235, the feature identifier 205, the user interface engine 217 and other components of the computing device 200 via signal line 224.

In one embodiment, the image processor 203 receives images of a packaged product from a user. The images of the packaged product can be high-resolution images. For example, an image of a packaged product may include a soda can, a rectangular cereal box, a circular tray of sandwich cookies, etc. A packaged product is three dimensional and includes textual and pictorial information printed on its surface. A packaged product may also sit in an arbitrary orientation on a surface at any given time. In one embodiment, the image processor 203 determines the geometry of a packaged product and requests the user to capture images of the packaged product in different orientations. In one embodiment, the image processor 203 instructs the user interface engine 217 to generate a graphical user interface that depicts a bounded box for the user to center the image of the product to capture images of the packaged product in different orientations. In one example, for a box-like packaged product such as a cereal box, the image processor 203 requests the user to capture images of four sides (ignoring top and bottom) of the box-like packaged product or six sides (including the top and bottom). In another example, for a cylindrically packaged product such as a soda can, the image processor 203 requests the user to capture eight or 12 images of the product where each image is captured by rotating the product 45 degrees on its axis of rotation (vertical or horizontal). In another example, where the cylindrical product is small, a fewer number of images are needed, for example four. In one embodiment, the image processor 203 compares the captured images to ensure that the relevant portions of the package were captured. In some embodiments, the image processor 203 instructs the user interface engine 217 to generate graphical data for instructing the user to retake pictures if a section of the image was missed, an image was too blurry, etc.

In one embodiment, the image processor 203 crops non-informative background regions from the received images to generate base images that contain only the packaged product. In one embodiment, the image processor 203 synthetically modifies the base images of the packaged product by scaling the base images to simulate, for example, an effect of varying distance between the camera and the packaged product. In another embodiment, the image processor 203 synthetically modifies the base images by blurring the base images to simulate, for example, an effect of camera shake or bad focus in the received images. In yet another embodiment, the image processor 203 synthetically modifies the base images by brightening the base images to simulate, for example, an effect of illumination differences in the received images.

In one embodiment, the image processor 203 sends the synthetically modified base images to the feature identifier 205 for feature extraction. In another embodiment, the image processor 203 stores the data including synthetically modified base images in the data storage 243. The image processor 203 is explained in greater detail in FIG. 3.

Figure 3:
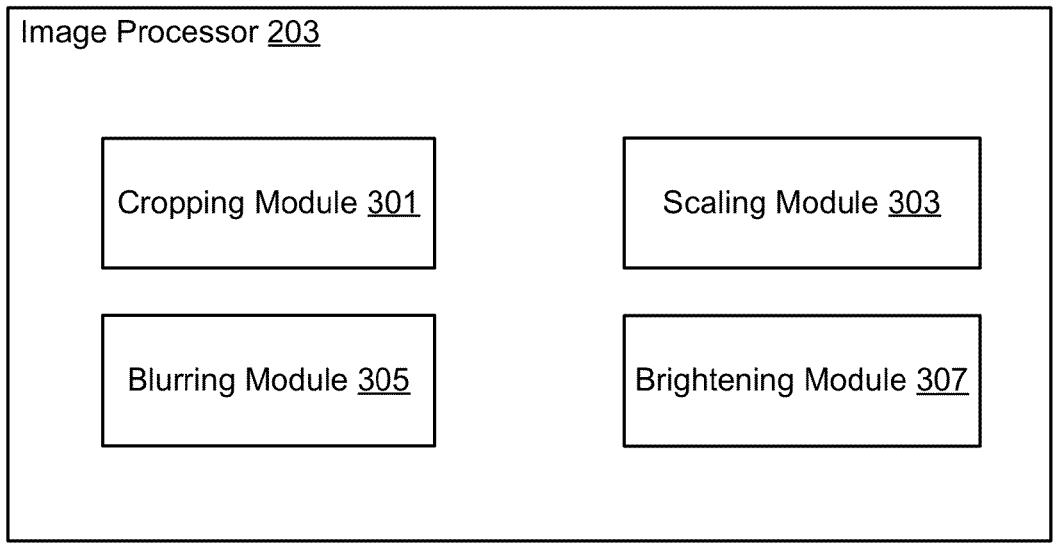
FIG. 3 is a block diagram illustrating one embodiment of an image processor.

Referring now to FIG. 3, an embodiment of the image processor 203 is shown in more detail. The image processor 203 includes a cropping module 301, a scaling module 303, a blurring module 305 and a brightening module 307 that are each coupled to signal line 224. Although the modules below are described as processing the images in a particular order, persons of ordinary skill in the art will recognized that the images could be processed in different orders. For example, first an image could be blurred and then it could be scaled. In addition, each module could modify the captured image directly instead of having a single image cropped, then scaled, then blurred, then brightened.

In one embodiment, the cropping module 301 receives images of the packaged products. For example, for a box-like product the cropping module 301 receives four or six faces for the product. For a cylindrical product, the cropping module 301 receives images of the product as it is rotated, for example eight or 12 images with a 45 degree of rotation between images. In one embodiment, the cropping module 301 determines whether the received images are free of illumination artifacts, such as excessive reflection. For example, if the image is of a packaged product that is very shiny. The cropping module 301 determines a first angle 'α' between the packaged product's surface and a light source and a second angle 'β' between the packaged product's surface and the client device capturing an image of the packaged product. A maximum reflection results as an artifact in the received image when the first angle 'α' and the second angle 'β' are equal. In one embodiment, the cropping module 301 instructs the user interface engine 217 to generate graphical data requesting the user to capture another image of the packaged product when the first angle 'α' is determined to be equal to the second angle 'β'.

In one embodiment, the cropping module 301 determines a background of the received image that is unwanted and crops the background of the received image to accentuate the region of interest (i.e. the packaged product). For example, the cropping module 301 receives an image of a cereal box on a white background and removes the white background while preserving the central image of the cereal box. In one embodiment, the cropping module 301 sends the data including cropped images to the scaling module 303. In another embodiment, the cropping module 301 stores the data including cropped images as base images of the packaged product in the data storage 243.

The scaling module 303 retrieves the base image of the packaged product that is cropped from the data storage 243 or receives the base image from the cropping module 301. The scaling module 303 scales the base image in different sizes to simulate the varying distance between the camera and the packaged product. For example, the scaling module 303 scales the base image bigger than the original base image to simulate a short distance between the camera and the packaged product. In one embodiment, the scaling module 303 scales the base image according to a minimum value among a width and a height of the base image. The scaling module 303 maintains the aspect ratio in all scaled images of the base image. For example, if the original image is of the size W×H and W>H>=600 pixels, then the scaling module 303 generates scaled images of following sizes: 600×'X', 300×'X'/2, and 150×'X'/4. In one embodiment, the scaling module 303 sends the data including scaled images to the blurring module 305. In another embodiment, the scaling module 303 stores the data including scaled images in the data storage 243.

In one embodiment, the blurring module 305 retrieves the scaled images from the data storage 243 or receives the scaled images from the scaling module 303. The blurring module 305 uses Gaussian Blurring effect on each of the scaled images to generate blurred images. For example, the blurring module 305 applies Gaussian blur sigma equal to 0.225 pixel, 0.45 pixel and 0.90 pixel on each of the scaled images to generate a set of blurred images. In one embodiment, the blurring module 305 sends the data including blurred images to the brightening module 307. In another embodiment, the blurring module 305 stores the data including blurred images in the data storage 243.

In one embodiment, the brightening module 307 retrieves the blurred images from the data storage 243 or receives the blurred images from the blurring module 305. The brightening module 307 applies brightening effects on each of the blurred images to simulate varying illumination conditions. For example, the brightening module 307 adds brightness effects by parameters −50 and −100 to each of the blurred images. In one embodiment, the brightening module 307 stores the brightened images in the data storage 243.

The feature identifier 205 can be software including routines for determining features in the received images. In one embodiment, the feature identifier 205 can be a set of instructions executable by the processor 235 to provide the functionality described below for determining features in the received images. In another embodiment, the feature identifier 205 can be stored in the memory 237 of the computing device 200 and can be accessible and executable by the processor 235. In either embodiment, the feature identifier 205 can be adapted for cooperation and communication with the processor 235, the image processor 203, the indexer 207, the user interface engine 217 and other components of the computing device 200 via signal line 226.

In one embodiment, the feature identifier 205 receives the synthetically modified images of packaged products from the image processor 203, extracts a set of features from each of the synthetically modified images and transmits them to the indexer 207 for indexing. The set of features extracted are robust to variations in scale, rotation, ambient lighting, image acquisition parameters, etc. The feature identifier 205 locates each feature in the set of features and determines a location, an orientation, and an image descriptor for each feature. An image descriptor of a feature is a 32-dimensional number which describes the image sub-region covered by the feature. In one embodiment, the feature identifier 205 shares data about the results of feature extraction by providing feedback to the image processor 203. Those skilled in the art will note that this significantly reduces computational requirements and improves accuracy by inhibiting the indexing of poor quality data.

In one embodiment, the feature identifier 205 receives a query image from a user. The query image is received for recognition and may include multiple items of interest. For example, the query image could be an image of a product shelf stocking multiple products (e.g., tea, breakfast cereals, soda cans, etc.) in a supermarket. The feature identifier 205 extracts features from the query image and sends the extracted feature set along with the query image to the matching engine 209.

In one embodiment, the feature identifier 205 receives the query image iteratively and partially blurred from the matching engine 209. The feature identifier 205 extracts features from the partially blurred query image in every iteration and sends the new extracted feature set along with the partially blurred query image to the matching engine 209. The matching engine 209 is explained in greater detail below.

In one embodiment, the feature identifier 205 sends data describing the extracted feature set from the images to the indexer 207 and the matching engine 209. In another embodiment, the feature identifier 205 stores the data describing the extracted feature set from the images in the data storage 243.

The indexer 207 can be software including routines for indexing images in a database to make them searchable during image recognition. In one embodiment, the indexer 207 can be a set of instructions executable by the processor 235 to provide the functionality described below for indexing the received images. In another embodiment, the indexer 207 can be stored in the memory 237 of the computing device 200 and can be accessible and executable by the processor 235. In either embodiment, the indexer 207 can be adapted for cooperation and communication with the processor 235, the feature identifier 205, the matching engine 209 and other components of the computing device 200 via signal line 228.

In one embodiment, the indexer 207 receives the base images including the set of features from the feature identifier 205 for indexing. In one embodiment, the indexer 207 maps the base images to a set of values, such as, a product name, product identifier, company name, company planogram, product price, number of units on stock, employee who stocks the product, etc. in Extensible Markup Language (XML) file format. The indexer 207 also includes the set of features identified for each product and a location in the base image where each feature occurs. In one embodiment, the indexer 207 organizes the indices to store the mappings in the data storage 243 to support a feature-based query and return results in JavaScript Object Notation (JSON) file format. In one embodiment, the indexer 207 indexes the base images including the set of features in a k-dimensional tree data structure to support faster retrieval.

The matching engine 209 can be software including routines for matching features from a query image to identify multiple items of interest. In one embodiment, the matching engine 209 can be a set of instructions executable by the processor 235 to provide the functionality described below for matching features from a query image. In another embodiment, the matching engine 209 can be stored in the memory 237 of the computing device 200 and can be accessible and executable by the processor 235. In either embodiment, the matching engine 209 can be adapted for cooperation and communication with the processor 235, the feature identifier 205, the blurring engine 211 and other components of the computing device 200 via signal line 230.

The matching engine 209 receives the features associated with a query image from the feature identifier 205. The matching engine 209 accesses the k-dimensional tree storing indexed image features in the data storage 243 to match features in the query image and the indexed images.

The matching engine 209 compares the set of features from the query image to features of indexed images in an electronic database. In one embodiment, the matching engine 209 determines whether a closest match to each feature associated with the query image exists among the features previously indexed. This is helpful for reducing the number of features that are compared in the set. The matching engine 209 determines that a comparison of the features forms a shape that is geometrically consistent. The two sets of features in the indexed image and the query image are geometrically consistent when they have the same shape, for example, when one set of features can be transformed to the other by a combination of translation, rotation and scaling. The matching engine 209 determines that the query image and the indexed image are matched when the geometrical consistency is determined.

In one embodiment, the matching engine 209 returns the first matched item and an associated region of interest denoting the first matched item identified in the query image. A region of interest can be of any shape, for example, a circle with a point and a diameter, a rectangular shape that includes a width, a height and one or more reference points for the region (e.g., a center point, one or more corner points for the region), etc. A reference point is specified by a first coordinate value (e.g., a value in the $\vec{x}$ coordinate) and a second coordinate value (e.g., a value in the $\vec{y}$ coordinate). For example, the matching engine 209 identifies a soda can in a query image of soda cans on a shelf with a rectangular polygon encircling the label on the soda can. In another embodiment, the region of interest (e.g., polygon) denoting the first matched item also identifies the item's dimensions. For example, the matching engine 209 identifies whether the soda can is a one quart can or a two quart can.

In some embodiments, the matching engine 209 sends the query image to the blurring engine 211 and instructs the blurring engine 211 to blur out the region of interest denoting the first matched item in the query image. The matching engine 209 receives the query image with region of interest blurred out and sends the modified query image again to the feature identifier 205 to extract features for identifying a next matched item in the query image that matches the previously indexed features in the k-dimensional tree. The matching engine 209 repeats the above procedure, that is, progressively blurring out a next matched item in the query image, sending the modified query image to the feature identifier 205 to extract features anew and identifying a next matched item, until the matching engine 209 fails to identify a next closest match with the features previously indexed in the k-dimensional tree. For example, if there are "n" items of interest in the query image, the matching engine 209 sends the query image to the feature identifier 205 "n+1" times. The matching engine 209 performs feature matching and geometrical consistency verification "n+1" times as well.

In another embodiment, the matching engine 209 receives the features (i.e. feature group) associated with the query image from the feature identifier 205 only once. For each feature the matching engine 209 determines whether a closest match exists among the previously indexed features. Once a closest match is found and the two sets of features in the indexed image and the query image are determined to be geometrically consistent to return a first matched item, then the matching engine 209 identifies the geometrically consistent matching set of features as inliers. The matching engine 209 estimates the region of interest where the first matched item was identified in the query image and removes the matching inliers from the feature group to create a reduced set of features. For example, if the feature group associated with a query image is numbered 1-1000 and feature set 100-200 are the geometrically consistent matching inliers, the matching engine 209 removes the feature set 100-200 from the feature group 1-1000. The matching engine 209 uses the reduced set of features to repeat the procedure of determining whether a closest match exists for each remaining feature among the previously indexed features, determining whether the matching set of features in the indexed image and the query image are geometrically consistent to return a next matched item, identifying the matching set of geometrically consistent features as inliers and removing the matching inliers from the feature group to further reduce the set of features until the matching engine 209 fails to identify a next closest match with the features previously indexed in the k-dimensional tree. For example, if there are "n" items of interest in the query image, the matching engine 209 performs feature matching and geometrical consistency verification "n+1" times.

In one embodiment, when no match is found, the matching engine 209 returns all the matched items identified in the query image to the user. A JavaScript Object Notation (JSON) file with information about all the previously identified items of interest is sent to the user.

In one embodiment, the matching engine 209 sends data including identified items of interest in the query image to the analyzer 213. In another embodiment, the matching engine 209 stores the data including identified items of interest in the data storage 243.

The blurring engine 211 can be software including routines for blurring regions of interest in a query image. In one embodiment, the blurring engine 211 can be a set of instructions executable by the processor 235 to provide the functionality described below for blurring regions of interest. In another embodiment, the blurring engine 211 can be stored in the memory 237 of the computing device 200 and can be accessible and executable by the processor 235. In either embodiment, the blurring engine 211 can be adapted for cooperation and communication with the processor 235, the feature identifier 205, the matching engine 209 and other components of the computing device 200 via signal line 232.

The blurring engine 211 receives the query image from the matching engine 209 and location coordinates for a region of interest to blur on the query image. In one embodiment, the blurring engine 211 uses Gaussian Blurring effect on the region of interest for blurring. The blurring engine 211 sends the partially blurred query image back to the matching engine 209.

The analyzer 213 can be software including routines for analyzing the items of interest based on the received query images. In one embodiment, the analyzer 213 can be a set of instructions executable by the processor 235 to provide the functionality described below for analyzing items of interest. In another embodiment, the analyzer 213 can be stored in the memory 237 of the computing device 200 and can be accessible and executable by the processor 235. In either embodiment, the analyzer 213 can be adapted for cooperation and communication with the processor 235, the feature identifier 205, the matching engine 209 and other components of the computing device 200 via signal line 234.

In one embodiment, the analyzer 213 analyzes the identified items of interest in the query images that are processed by the feature identifier 205 and the matching engine 209. For example, a user or camera captures images of product shelves in a supermarket periodically and the analyzer 213 analyzes the identified products of interest. In one embodiment, the analyzer 213 generates a planogram for the identified items of interest based on initial values of the products and on administrator's guidelines. A planogram generally refers to a plan or other specification of a layout or positioning of items within a pre-defined location or geographical area. For example, a planogram can be a diagram that is used in a retail environment to provide details about the layout of a store, such as a grocery store. The planogram describes a product's location in an aisle and on a shelf and the quantity of the product. Such planograms are known to be effective tools for increasing sales, managing inventory and otherwise ensuring that desired items are correctly placed to optimize profits or other parameters.

In another embodiment, the analyzer 213 receives the data including identified items of interest in the query image from the matching engine 209 and determines the location of each of the identified items of interest. The analyzer 213 checks whether the location and position of the items identified in the query image are compliant with a planogram received from the company or companies producing the items. For example, a soda pop manufacturer sends a planogram that lists that soda A should be at eye-level in the beverage aisle and the analyzer 213 determines whether the identified soda A cans in the query images sent by the user comply with the planogram.

In one embodiment, the analyzer 213 determines whether changes in an item inventory identified in the query images exceed a threshold. If the changes exceed a threshold, the analyzer 213 instructs the notification engine 215 to generate a notification for the user. For example, the analyzer 213 can determine whether breakfast cereal boxes identified in a query image of a product shelf are out of stock or nearly empty and the analyzer 213 instructs the notification engine 215 to notify the store employee to restock the breakfast cereal boxes.

In one embodiment, the analyzer 213 generates statistics associated with the items of interest identified in the query image. The statistics could detail the frequency with which an item is purchased, at what time of the day it is purchased and from which location in the stocked shelf it is picked up. For example, the statistics details whether soda cans placed at eye-level sell faster than those placed above the eye-level, whether the soda cans sell faster on game days, etc. In one embodiment, the analyzer 213 associates the statistics with the item description in the k-dimensional tree in the data storage 243.

The notification engine 215 can be software including routines for generating notifications associated with items of interest. In one embodiment, the notification engine 215 can be a set of instructions executable by the processor 235 to provide the functionality described below for generating notifications. In another embodiment, the notification engine 215 can be stored in the memory 237 of the computing device 200 and can be accessible and executable by the processor 235. In either embodiment, the notification engine 215 can be adapted for cooperation and communication with the processor 235, the analyzer 213, the user interface engine 217 and other components of the computing device 200 via signal line 236.

In one embodiment, the notification engine 215 receives instructions from the analyzer 213 to generate a notification when changes in an item inventory are detected to exceed a threshold. In one embodiment, the notification engine 215 sends instructions to the user interface engine 217 to generate a graphical image for displaying the notification to the user. In some embodiments, the notification engine 215 instructs the communication engine 241 to transmit the notification to a user based on a user preference. For example, the communication engine 241 can send the notification via email, text, short messaging service (SMS), as a notification within a thin-client application, etc.

The user interface engine 217 is software including routines for generating graphical data for providing user interfaces to users. In one embodiment, the user interface engine 217 is a set of instructions executable by the processor 235 to provide the functionality below for generating graphical data for providing the user interfaces. In another embodiment, the user interface engine 217 is stored in the memory 237 and is accessible and executable by the processor 235. In either embodiment, the user interface engine 217 is adapted for cooperation and communication with the processor 235 and other components of the computing device 200 via signal line 238.

In one embodiment, the user interface engine 217 receives instructions from the image processor 203 to generate a graphical interface that depicts orientations for the user to capture images of box-like or cylindrical products of interest. In another embodiment, responsive to a user of a client device 115 requesting to identify items of interest, the user interface engine 217 receives the location of region of interest from the matching engine 209 and generates a polygon outline to identify the item. In yet another embodiment, the user interface engine 217 generates a graphical image for displaying the notification received from the notification engine 215. The user interface module 217 sends the graphical data to an application (e.g., a browser) in the client device 115 via the communication unit 241 causing the application to display the data in a user interface.

Example Methods and Graphic Representations

Figure 4A:
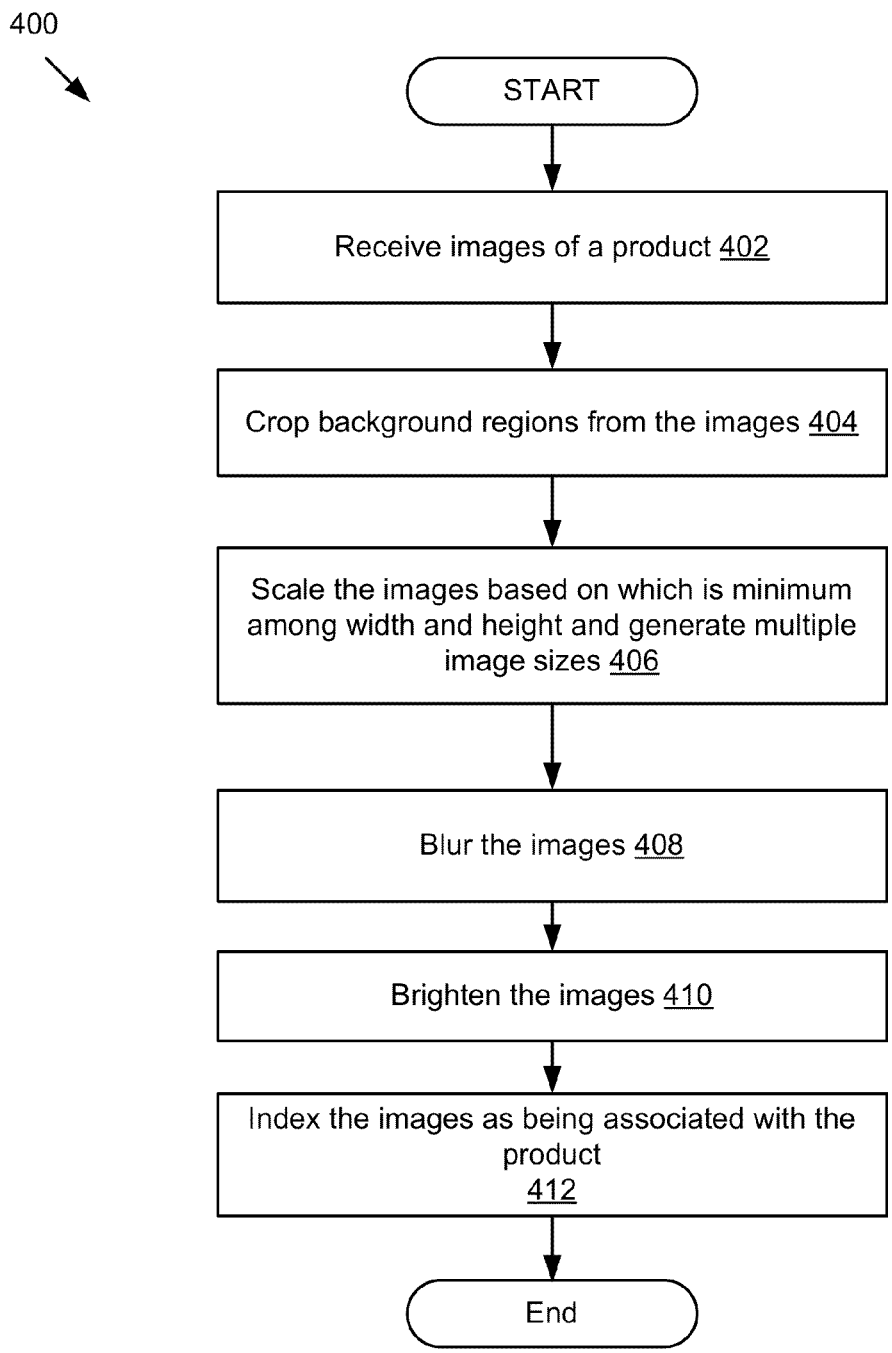
FIG. 4A is a flow diagram illustrating one embodiment of an indexing method.

FIG. 4A is a flow diagram 400 of one embodiment of a method for indexing images. The image recognition application 103 includes an image processor 203 and an indexer 207. The image processor 203 includes a cropping module 301, a scaling module 303, a blurring module 305 and a brightening module 307. The cropping module 301 receives 402 images of a product and crops 404 background regions from the images. For example, the cropping module 301 receives an image of a cereal box on a white background and removes the white background while preserving the central image of the cereal box. The scaling module 303 scales 406 the images based on a minimum value among width and height and generate multiple image sizes. For example, the scaling module 303 generates a scaled image bigger than the original image to simulate a short distance between the camera and the packaged product and a scaled image smaller than the original image to simulate a long distance between the camera and the packaged product. The blurring module 305 blurs 408 the images. For example, the blurring module 305 applies Gaussian blur sigma equal to 0.225 pixel, 0.45 pixel and 0.90 pixel on each of the scaled images to generate a set of blurred images. The brightening module 307 brightens 410 the images. The indexer 207 indexes 412 the images as being associated with the product. For example, the indexer 207 maps the images to a set of values, such as, a product name, product identifier, company name, company planogram, product price, number of units on stock, etc.

Figure 4B:
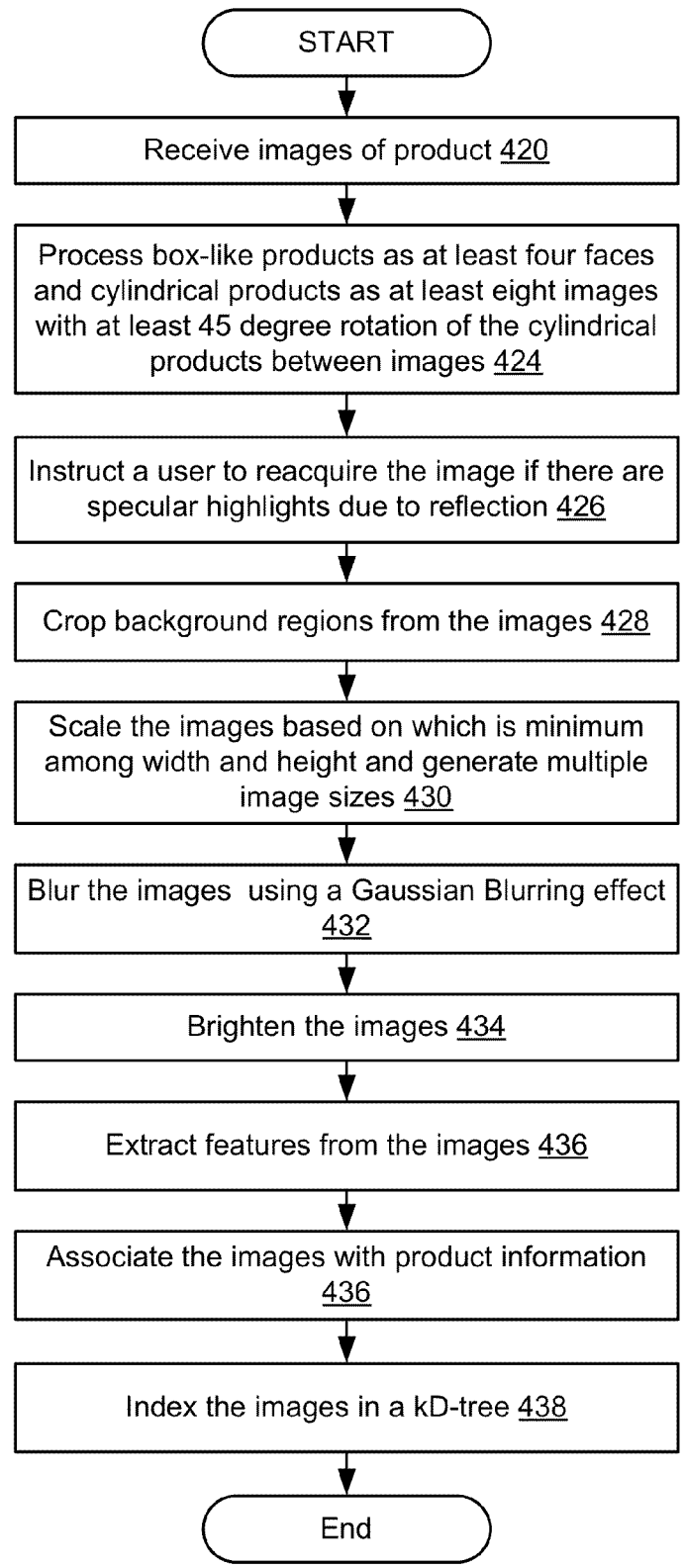
FIG. 4B is a flow diagram illustrating another embodiment of an indexing method.

FIG. 4B is a flow diagram 418 of one embodiment of another method for indexing images. The image recognition application 103 includes an image processor 203, a feature identifier 205 and an indexer 207. The image processor 203 includes a cropping module 301, a scaling module 303, a blurring module 305 and a brightening module 307. The cropping module 301 receives 420 images of product. The cropping module 301 processes 424 box-like products as at least four images and cylindrical products as at least eight images with at least 45 degree rotation of the cylindrical products between images. For example, the cropping module 301 receives four significant sides (ignoring top and bottom) or six sides (including the top and bottom) of a box-like packaged product and eight or 12 images of a cylindrical product where each image is captured by rotating the product 45 degrees on its axis of rotation (vertical or horizontal). In one embodiment, the cropping module 301 instructs 426 the user to reacquire the image if the product has specular highlights (i.e. if the product looks too shiny to identify the image). This occurs, for example, when a first angle between the product's surface and the light source is equal to a second angle between the surface and the camera. The cropping module 301 crops 428 background regions from the images. The scaling module 303 scales 430 the images based on which is minimum among width and height and generate multiple image sizes. The blurring module 305 blurs 432 the images using a Gaussian Blurring effect. The brightening module 307 brightens 434 the images. The feature identifier 205 extracts 436 features from the images. For example, the features extracted include a location, an orientation, and an image descriptor for each feature. The indexer 207 associates 436 the images with product information and indexes 438 the images in a k-D tree. The indexer 207 indexes the base images including the set of features in a k-dimensional tree data structure to support faster retrieval.

Figure 5A:
FIGS. 5A-5D illustrate examples of images that are indexed.
Figure 5A:
Figure 5A:
Figure 5A:
Figure 5A:

FIGS. 5A-5D are graphic representations 520, 540, 560 and 580 illustrating various embodiments of indexing images. Referring to FIG. 5A, the graphic representation 520 includes base images 522, 524, 526 and 528 that are captured from a cylindrically packaged product. Each of the base images 522, 524, 526 and 528 are captured by rotating the product 45 degrees on its horizontal axis of rotation until the entire cylindrical portion of the product is captured. Although only four base images are illustrated in the graphic representation 520, persons of ordinary skill will recognize that four or eight more base images can be captured, thereby acquiring eight or 12 base images, respectively, capturing the entire cylindrical portion of the product. The base images 522, 524, 526 and 528 are cropped to remove any background region that in not informative and include only the relevant portion of the product of interest.

Figure 5B:
Figure 5B:
Figure 5B:

Referring to FIG. 5B, the graphic representation 540 includes the base image 522 from FIG. 5A scaled to different sizes to simulate varying distances between the camera and the packaged product. The scaled images 542, 544 and 546 are scaled according to the dimension which is minimum among width and height while preserving the aspect ratio. Although only base image 522 is shown scaled to three different sizes, persons of ordinary skill will recognize that the same procedure can be repeated for the other base images 524, 526 and 528 in FIG. 5A.

Figure 5C:
Figure 5C:
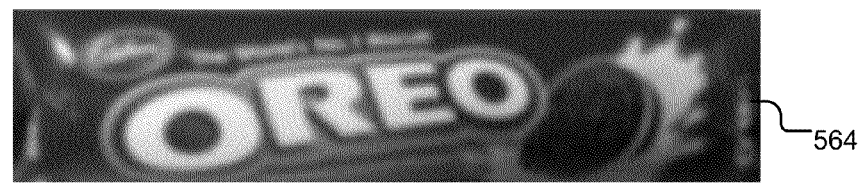
Figure 5C:
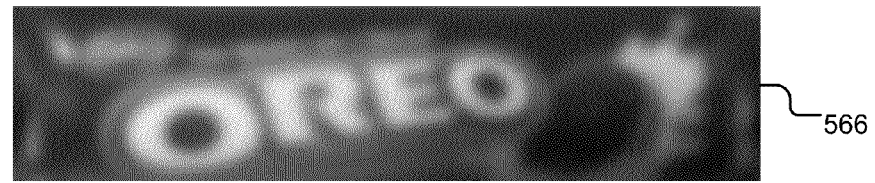

Referring to FIG. 5C, the graphic representation 560 includes the scaled image 542 from FIG. 5B blurred into three different blurred images to simulate an effect of camera shake or bad focus in captured images of the packaged product. The blurred images 562, 564 and 566 are blurred by adding Gaussian blur sigma equal to, for example, 0.225 pixel, 0.45 pixel and 0.90 pixel respectively. Although only scaled image 542 is shown blurred to generate three different blurred images, persons of ordinary skill will recognize that the same procedure can be repeated for the other scaled images 544 and 546 in FIG. 5B.

Figure 5D:
Figure 5D:
Figure 5D:

Referring to FIG. 5D, the graphic representation 580 includes the blurred image 562 from FIG. 5C subjected to brightening effects to simulate varying illumination differences in captured images of the packaged product. The three brightened images 582, 584 and 586 are each obtained by applying a varying brightness parameter on the blurred image 562. Although only blurred image 562 is shown applied with brightening effects to generate three different brightened images, persons of ordinary skill will recognize that the same procedure can be repeated for the other blurred images 564 and 566 in FIG. 5C. In addition, each of these effects can be applied in a different order from what is described above.

Figure 6:
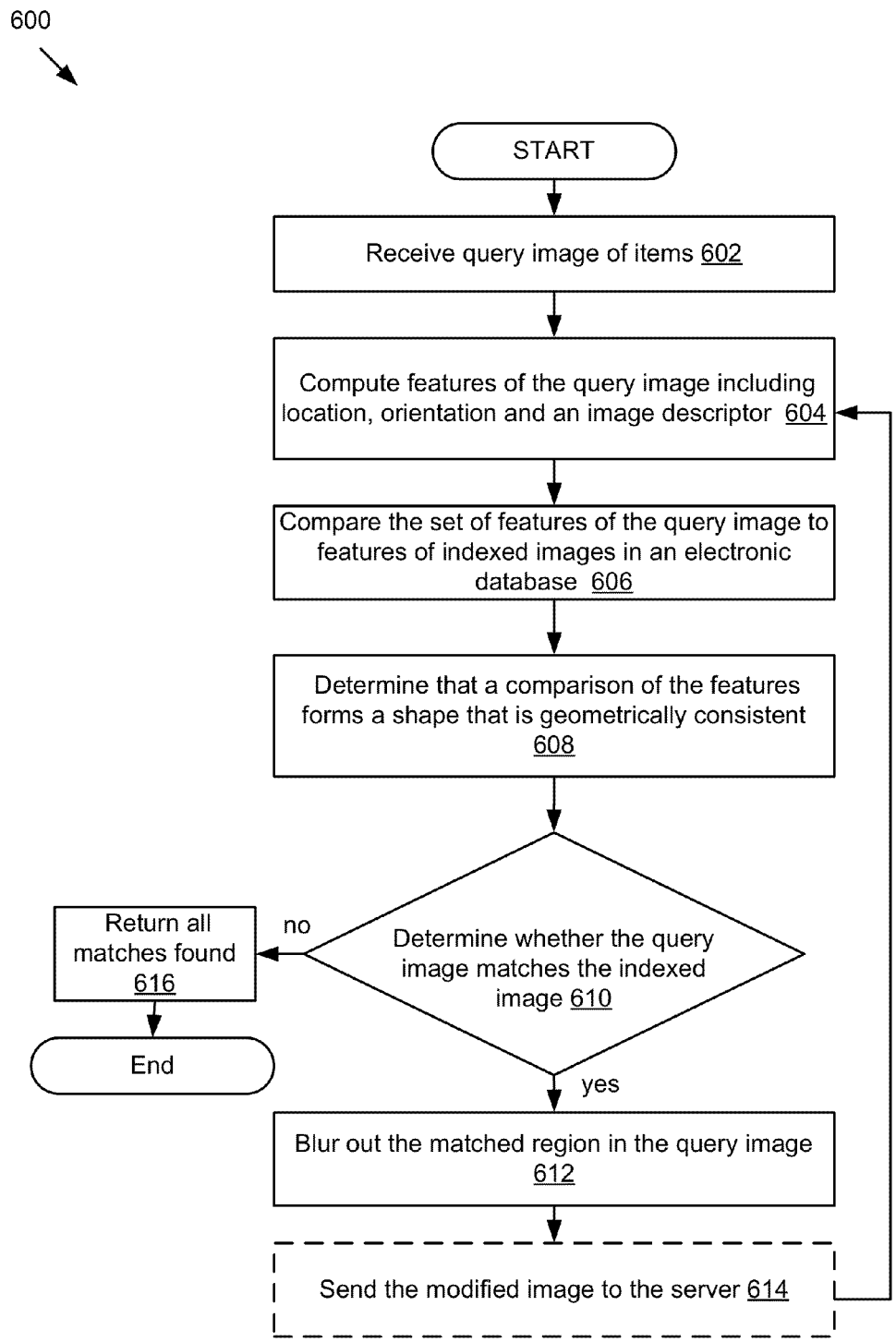
FIG. 6 illustrates one embodiment of a retrieval method for identifying products in a query image by using blurring.

FIG. 6 is a flow diagram 600 of one embodiment of a method for identifying products in a query image by blurring. The image recognition application 103 includes a feature identifier 205, a matching engine 209 and a blurring engine 211. In one embodiment, the feature identifier 205 receives 602 a query image of items and computes 604 features of the query image including location, orientation and an image descriptor. For example, the query image could be an image of a product shelf stocking multiple products (e.g., tea, breakfast cereals, soda cans, etc.) in a supermarket. The matching engine 209 compares 606 the set of features of the query image to features of indexed images in an electronic database, determines 608 that a comparison of the features forms a shape that is geometrically consistent and determines 610 whether the query image matches the indexed image. In one embodiment, the matching engine 209 finds an indexed image with a closest matched feature for each feature from the query image. If there is no closest matching set of features to determine geometrical consistency, the method would begin again. If the query image matches the indexed image, the blurring engine 211 blurs out 612 the matched region in the query image.

In an optional embodiment, the blurring engine 211 is stored on the client device 115 and sends 614 the modified image to the recognition server 101. Following that, the feature identifier 205 repeats the step 604 and the matching engine 209 repeats the steps 606 through 608. For example, if there are "n" items of interest in the query image, the matching engine 209 sends the query image to the feature identifier 205 "n+1" times. If the query image is not matched with the indexed image, the matching engine 209 returns 616 all matches found.

Figure 7:
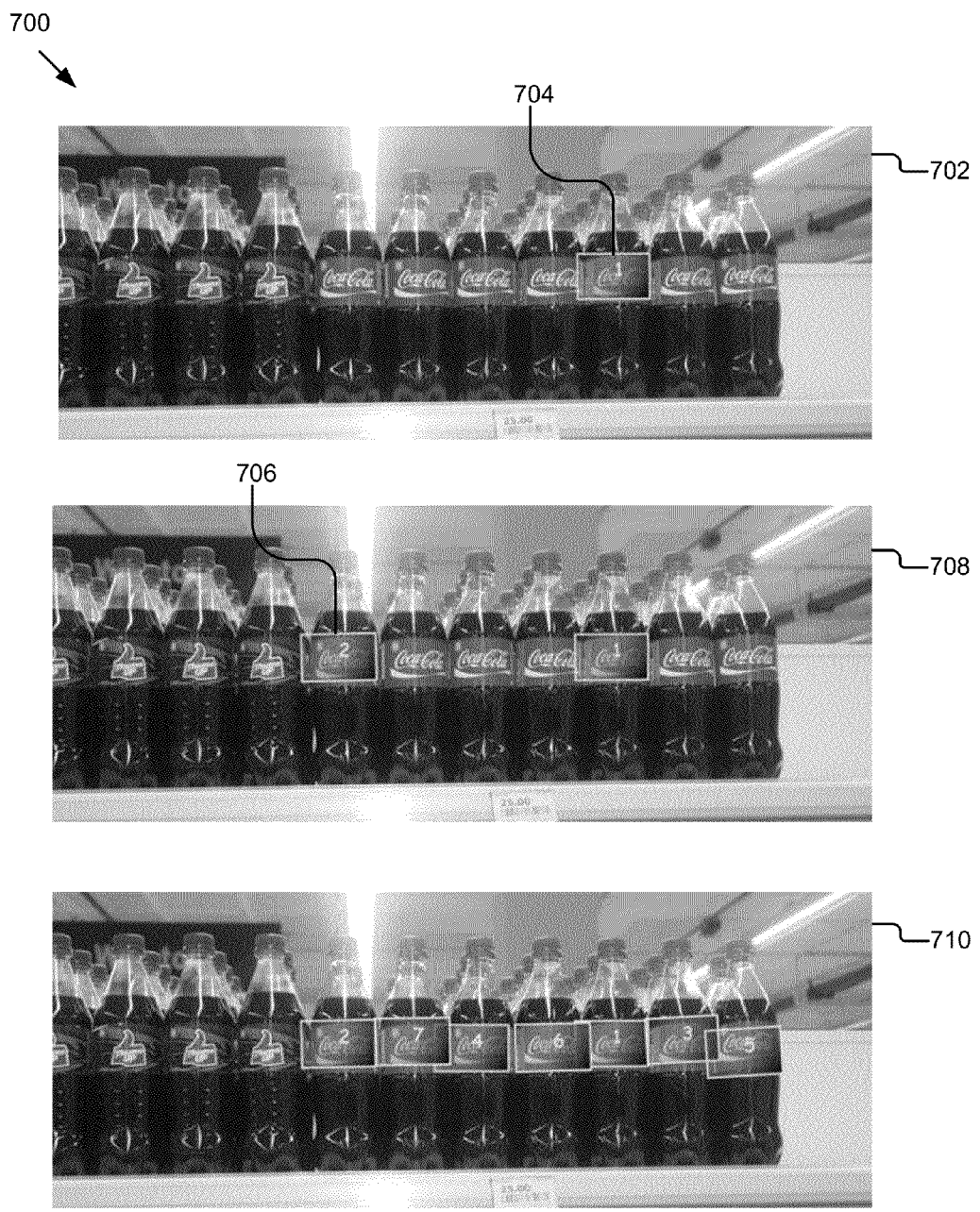
FIG. 7 is a graphical representation of one embodiment of the blurring process described in FIG. 6.

FIG. 7 is a graphic representation 700 of one embodiment of identifying products in a query image by using blurring described in FIG. 6. In the illustrated embodiment, each of the red soda can in the capture or query image 702 is identified one after the other. In a first iteration of the identifying process described in FIG. 6, the first red soda can represented by the first rectangle 704 is found in the query image 702. The region inside the first rectangle 704 is blurred out by the blurring engine 211 and the modified query image is sent out again to the feature identifier 205 in the recognition server 101. A second red soda can represented by the second rectangle 706 is found in the modified query image 708 sent to the recognition server 101. Persons of ordinary skill will understand that after the eighth iteration, all seven red soda cans are found in the last modified query image 710.

Figure 8:
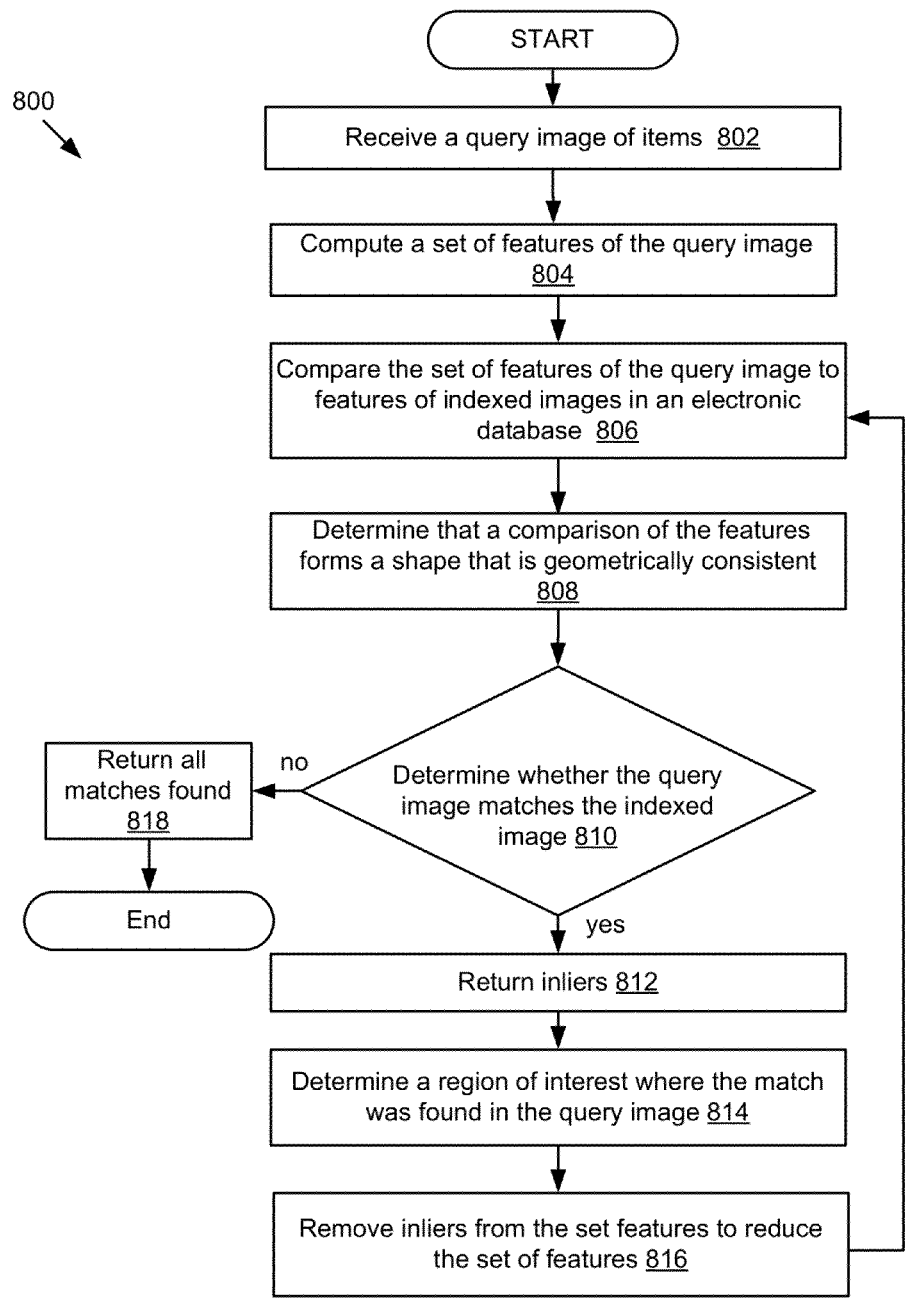
FIG. 8 illustrates one embodiment of a retrieval method for identifying products in a query image by removing inliers from the set of features.

FIG. 8 is a flow diagram 800 of one embodiment of another method for identifying products in a query image by removing inliers from the set of features. The image recognition application 103 includes a feature identifier 205 and a matching engine 209. In one embodiment, the feature identifier 205 receives 802 a query image of items and computes 804 a set of features of the query image. The matching engine 209 compares 806 the set of features of the query image to features of indexed images in an electronic database, determines 808 that a comparison of the features forms a shape that is geometrically consistent and determines 810 whether the query image matches the indexed image. In one embodiment, the matching engine 209 finds an indexed image with a closest matched feature to each feature from the query image. If there is no closest matching set of features to determine geometrical consistency, the method would begin again. If the query image matches the indexed image, the matching engine 209 returns 812 inliers, determines 814 a region of interest where the match was found in the query image and removes 816 inliers from the set features to reduce the set of features. For example, if the feature group associated with the query image is numbered 1-1000 and feature set 100-200 are the geometrically consistent matching inliers, the matching engine 209 removes the feature set 100-200 from the feature group 1-1000. Following that, the matching engine 209 repeats the steps 806 through 808. For example, if there are "n" items of interest in the query image, the matching engine 209 performs feature matching and geometrical consistency verification "n+1" times. If the query image is not matched with the indexed image, the matching engine 209 returns 818 all matches found.

Figure 9:
FIG. 9 is a graphical representation of one embodiment of the process of removing inliers from the set of features during the recognition process described in FIG. 8.

FIG. 9 is a graphic representation 900 of one embodiment of the process of removing inliers from the set of features during the recognition process described in FIG. 8. The graphic representation 900 includes an indexed image 902 of a cookie pack and a query image 904 received from a user that includes 10 of the cookie packs. A set of features computed on the indexed image 902 and the query image 904 are illustrated as circles 906. In the illustrated embodiment, the set of features in the query image 904 are computed once and each one of the cookie packs in the query image 904 is identified one after the other. In a first iteration, features represented by the rectangle 908 in a sub-region of the query image 904 are found by the matching engine 209 to be a closest match with the set of features in the indexed image 902. In addition, they are also found to be geometrically consistent. The geometrically matched features inside the rectangle 908 called inliers are removed from the set of features identified for the query image 908. In a second iteration, the reduced set of features is again sent to the matching engine 209 to find a next closest match with the set of features. After the eleventh iteration, all 10 cookie packs are identified in the query image 904.

Figure 10:
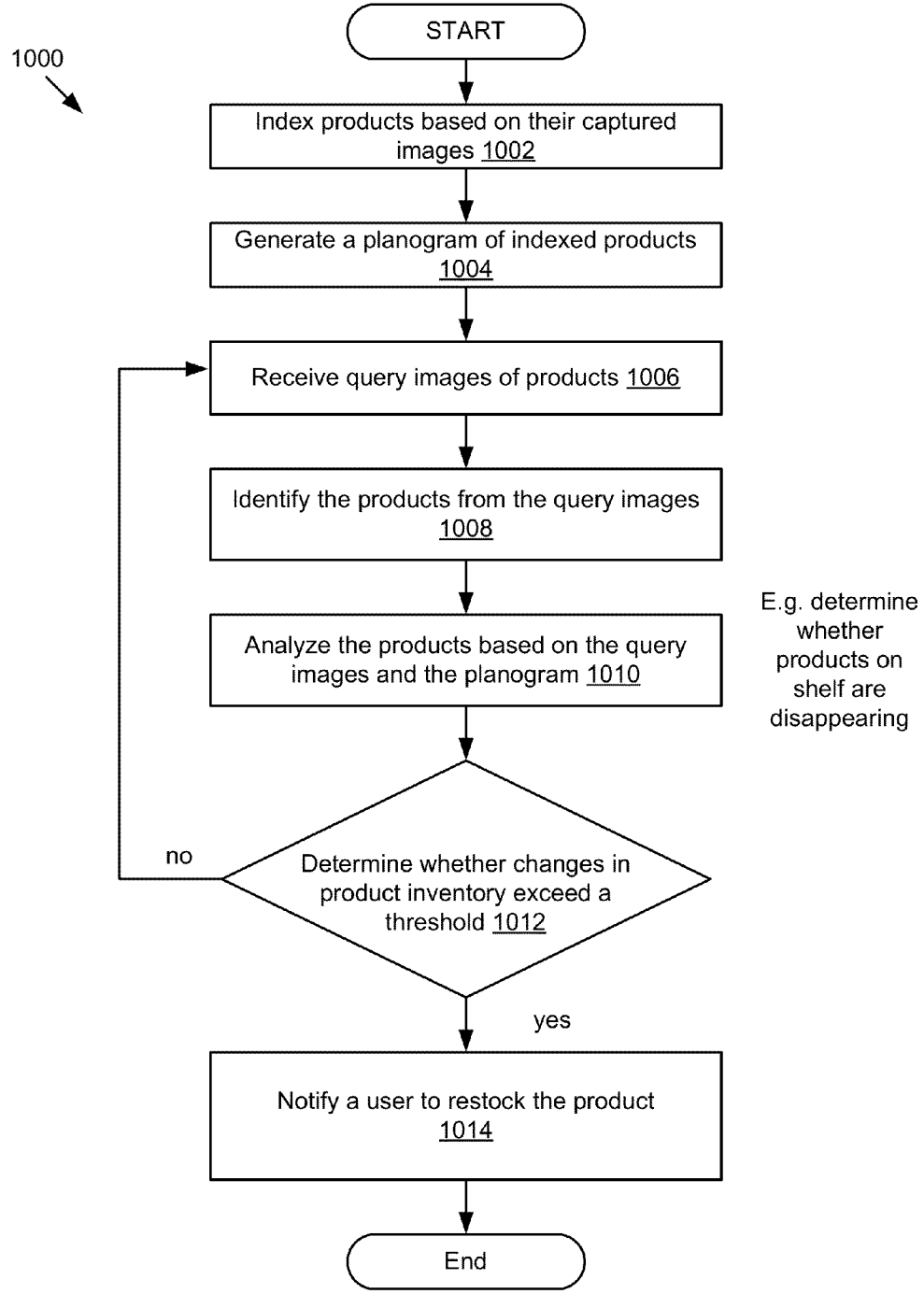
FIG. 10 illustrates one embodiment of an application of the planogram.

FIG. 10 is a flow diagram 1000 of one embodiment of an application of a planogram. The image recognition application 103 includes an indexer 207, a feature identifier 205, a matching engine 209, an analyzer 213 and a notification engine 215. In one embodiment, the indexer 207 indexes 1002 products based on their captured images. For example, the indexer 207 maps the base images to a set of values, such as, a product name, product identifier, company name, company planogram, product price, number of units on stock, employee who stocks the product. The analyzer 213 generates 1004 a planogram of indexed products. A planogram is a diagram that provides details about the layout of a store. The planogram describes a product's location in an aisle and on a shelf and the quantity of the product.

The feature identifier 205 receives 1006 query images of products. For example, a grocery store has cameras installed in the shelves to provide periodic images of the shelves. The matching engine 209 identifies 1008 the products from the query images. For example, the matching engine 209 identifies a soda can in a query image of soda cans on a shelf with a rectangular polygon encircling the label on the soda can. The analyzer 213 analyzes 1010 the products based on the query images and the planogram and determines 1012 whether changes in product inventory exceed a threshold. For example, the analyzer 213 can determine whether breakfast cereal boxes identified in a query image of a product shelf are out of stock or nearly empty. This analysis can be performed for multiple products and the planogram can include information for the multiple products. There can also be planograms for each distinct product.

If the changes to the product inventory exceed a threshold, the notification engine 215 notifies 1014 a user to restock the product. If the changes to the product inventory do not exceed a threshold, the feature identifier 205 repeats the step 1006. Following that, the matching engine 209 repeats the step 1008 and the analyzer 213 repeats the step 1010.

Figure 11:
FIG. 11 is a graphical presentation of one embodiment of the process of analyzing the products.

FIG. 11 is a graphic representation 1100 of one embodiment of the process of analyzing the products. The graphic representation includes a set 1102 of images previously indexed. In the illustrated embodiment, a query image 1104 of a shelf including multiple products of interest is received and the query image 1104 is analyzed. The products of interest in the query image 1104 are identified by matching against the set 1102 of indexed images. The identified products are each denoted by a rectangle 1108 in the analyzed image 1106 for the user to analyze. In one embodiment, a product that is selling can be identified by a circle 1110 in the analyzed image 1106 for the user.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   receiving, with one or more processors, a query image of items;
   computing, with the one or more processors, a set of features of the query image;
   comparing, with the one or more processors, the set of features of the query image with features of indexed images in data storage;
   determining, with the one or more processors, that a shape formed from the set of features of the query image is geometrically consistent with a shape formed from features of a first indexed image, wherein the shapes are determined to be geometrically consistent based on the features being inter-transformable by a combination of translation, rotation, and scaling;
   determining, with the one or more processors, whether the query image matches the first indexed image;
   responsive to the query image matching the first indexed image, determining, with the one or more processors, a region of interest where the match was found in the query image;
   removing inliers corresponding to the region of interest from the set of features of the query image to produce a reduced set of features;
   for the reduced set of features, comparing, with the one or more processors, the reduced set of features of the query image with the features of indexed images in data storage and determining that a shape formed from the reduced set of features is geometrically consistent with a shape formed from features of a second indexed image;
   determining, with the one or more processors, whether the query image matches the second indexed image; and
   returning all matches found.

2. The method of claim 1, wherein each feature, of the features of indexed images, is associated with a location, orientation and an image descriptor.

3. The method of claim 1, wherein the inliers are a set of matched features.

4. The method of claim 1, wherein the first indexed image and the second indexed image are the same indexed image.

5. The method of claim 1, wherein the items are products and further comprising generating a planogram of indexed products.

6. The method of claim 5, further comprising analyzing products based on the query images and the planogram.

7. The method of claim 6, further comprising generating statistics about a location of products and frequency of purchase.

8. A system comprising:
   one or more processors;
   a controller stored on a memory and executable by the one or more processors, the controller configured to receive a query image of items;
   a feature identifier coupled to the controller and configured to compute a set of features of the query image;
   a matching engine coupled to the feature identifier and configured to compare the set of features of the query image with features of indexed images in data storage, determine that a shape formed from the set of features of the query image is geometrically consistent with a shape formed from features of a first indexed image, wherein the shapes are determined to be geometrically consistent based on the features being inter-transformable by a combination of translation, rotation, and scaling and determine whether the query image matches the first indexed image;
   wherein the matching engine determines a region of interest where the match was found in the query image, responsive to the query image matching the first indexed image, removes inliers corresponding to the region of interest from the set of features of the query image to produce a reduced set of features;
   for the reduced set of features, the matching engine compares the reduced set of features of the query image with features of indexed images in data storage, determines that a shape formed from the reduced set of features is geometrically consistent with a shape formed from features of a second indexed image, and determines whether the query image matches the second indexed image, and returns all matches found.

9. The system of claim 8, wherein each feature, of the features of indexed images, is associated with a location, orientation and an image descriptor.

10. The system of claim 8, wherein the inliers are a set of matched features.

11. The system of claim 8, wherein the first indexed image and the second indexed image are the same indexed image.

12. The system of claim 8, wherein the items are products and further comprising an analyzer that is configured to generate a planogram of indexed products.

13. The system of claim 12, wherein the analyzer is further configured to analyze products based on the query images and the planogram.

14. The system of claim 13, wherein the analyzer is further configured to generate statistics about a location of products and frequency of purchase.

15. A computer program product comprising a computer useable medium including a computer readable program, wherein the computer readable program when executed on a computer causes the computer to:
- receive a query image of items;
- compute a set of features of the query image;
- compare the set of features of the query image with features of indexed images in data storage;
- determine that a shape formed from the set of features of the query image is geometrically consistent with a shape formed from features of a first indexed image, wherein the shapes are determined to be geometrically consistent based on the features being inter-transformable by a combination of translation, rotation, and scaling;
- determine whether the query image matches the first indexed image;
- responsive to the query image matching the first indexed image, determine a region of interest where the match was found in the query image;
- remove inliers corresponding to the region of interest from the set of features of the query image to reduce the set of features;
- for the reduced set of features, compare the reduced set of features of the query image with the features of indexed images and determine that a shape formed from the reduced set of features is geometrically consistent with a shape formed from features of a second indexed image and whether the query image matches the second indexed image; and
- return all matches found.

16. The computer program product of claim 15, wherein each feature, of the features of indexed images, is associated with a location, orientation and an image descriptor.

17. The computer program product of claim 15, wherein the inliers are a set of matched features.

18. The computer program product of claim 15, wherein the first indexed image and the second indexed image are the same indexed image.

19. The computer program product of claim 15, wherein the items are products and wherein the computer readable program when executed on the computer causes the computer to also generate a planogram of indexed products.

20. The computer program product of claim 19, wherein the computer readable program when executed on the computer causes the computer to also analyze products based on the query images and the planogram.

* * * * *